United States Patent
Lee et al.

(10) Patent No.: US 10,878,616 B2
(45) Date of Patent: Dec. 29, 2020

(54) SYSTEM AND METHOD FOR ASSIGNING COORDINATES IN VIRTUAL REALITY ENVIRONMENT

(71) Applicant: HTC Corporation, Taoyuan (TW)

(72) Inventors: Hsin-Hao Lee, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/726,372

(22) Filed: Oct. 5, 2017

(65) Prior Publication Data

US 2018/0293785 A1 Oct. 11, 2018

Related U.S. Application Data

(60) Provisional application No. 62/482,207, filed on Apr. 6, 2017.

(51) Int. Cl.
*G06T 19/00* (2011.01)
*G06T 15/20* (2011.01)
(Continued)

(52) U.S. Cl.
CPC .............. *G06T 15/20* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS

2013/0141419 A1\* 6/2013 Mount ............... G06F 3/011
345/419
2013/0162632 A1 6/2013 Varga et al.
(Continued)

FOREIGN PATENT DOCUMENTS

CN 103480154 A 1/2014
CN 104076513 A 10/2014
(Continued)

OTHER PUBLICATIONS

Misha Sra et al., "Bringing real objects, spaces, actions, and interactions into social VR", 2016 IEEE Third VR International Workshop on Collaborative Virtual Environments (3DCVE), Mar. 20, 2016, pp. 16-17.
(Continued)

*Primary Examiner* — Steven Z Elbinger
(74) *Attorney, Agent, or Firm* — CKC & Partners Co., LLC (57) ABSTRACT

Present disclosure relates to a system for providing a simulated environment to multiple users and a method thereof. The system comprises a first wearable device operated in a first space, a second wearable device operated in a second space, and a computing unit. The first wearable device is configured to output a first scenario based on a first coordinate corresponding to the first wearable device in the simulated environment. The second wearable device is configured to output a second scenario based on a second coordinate corresponding to the second wearable device in the simulated environment. The computing unit is configured to retrieve a first spatial constraint of the first space and a second spatial constraint of the second space, and to assign the first coordinate and the second coordinate according to the first spatial constraint and the second spatial constraint.

6 Claims, 6 Drawing Sheets

(51) Int. Cl.
*G06F 3/01* (2006.01)
*G06F 3/0481* (2013.01)

(52) U.S. Cl.
CPC ........ *G06F 3/04815* (2013.01); *G06T 19/003* (2013.01); *G06T 2215/16* (2013.01); *G06T 2219/024* (2013.01)

(56) References Cited

U.S. PATENT DOCUMENTS

| | | | | |
|---|---|---|---|---|
| 2013/0325327 | A1* | 12/2013 | Yamaoka | G01C 21/206 701/445 |
| 2013/0328928 | A1 | 12/2013 | Yamagishi et al. | |
| 2016/0033770 | A1* | 2/2016 | Fujimaki | G06T 19/006 345/8 |
| 2017/0228922 | A1* | 8/2017 | Kaeser | G06F 3/04815 |
| 2017/0277260 | A1* | 9/2017 | Tamaoki | G02B 27/0093 |
| 2017/0354875 | A1* | 12/2017 | Marks | A63F 13/213 |
| 2018/0096244 | A1* | 4/2018 | Mallinson | H04N 13/366 |
| 2018/0190022 | A1* | 7/2018 | Zamir | G06F 3/011 |
| 2018/0190027 | A1* | 7/2018 | Yao | G06F 3/011 |

FOREIGN PATENT DOCUMENTS

| | | |
|---|---|---|
| CN | 106125903 A | 11/2016 |
| CN | 106445169 A | 2/2017 |
| TW | I449953 B | 8/2014 |

OTHER PUBLICATIONS

Corresponding extended European search report dated Jun. 8, 2018.
Corresponding Taiwan office action dated Oct. 31, 2018.
Corresponding Chinese office action dated Aug. 5, 2019.

* cited by examiner

SYSTEM AND METHOD FOR ASSIGNING COORDINATES IN VIRTUAL REALITY ENVIRONMENT

CROSS-REFERENCE TO RELATED APPLICATION

This application claims priority to U.S. Provisional Application Ser. No. 62/482,207, filed on Apr. 6, 2017, which is herein incorporated by reference.

BACKGROUND

Field of Invention

Present disclosure relates to a system and a method for providing a simulated environment. More particularly, the present disclosure relates to the system and the method for providing simulated environment to multiple users.

Description of Related Art

Virtual reality technology is very powerful when being applied to a group of people, especially when being applied for holding a conference or a workshop. It is much intuitive for having a prototype or a blueprint being presented in a visible three dimensional space rather than only on a two dimensional picture. However, there are still some unsolved problems for providing a virtual reality environment to multiple users located in different places.

SUMMARY

The disclosure relates to a system for providing a simulated environment. The system comprises a first wearable device, a second wearable device and a computing unit. The first wearable device operated in a first space is configured to output a first scenario of the simulated environment, wherein the first scenario is provided based on a first coordinate corresponding to the first wearable device in the simulated environment. The second wearable device is operated in a second space configured to output a second scenario of the simulated environment, wherein the second scenario is provided based on a second coordinate corresponding to the second wearable device in the simulated environment. The computing unit is configured to retrieve a first spatial constraint of the first space and a second spatial constraint of the second space. The computing unit is also configured to assign the first coordinate and the second coordinate according to the first spatial constraint and the second spatial constraint simultaneously.

Another aspect of present disclosure is to provide a method for providing a simulated environment. The method comprises following steps: outputting, by a first wearable device operated in a first space, a first scenario of the simulated environment, wherein the first scenario is provided based on a first coordinate corresponding to the first wearable device in the simulated environment; outputting, by a second wearable device operated in a second space, a second scenario of the simulated environment to the second user, wherein the second scenario is provided based on a second coordinate corresponding to the second wearable device in the simulated environment; retrieving, by a computing unit, a first spatial constraint of the first space and a second spatial constraint of the second space; and assigning, by the computing unit, the first coordinate and the second coordinate according to the first spatial constraint and the second spatial constraint simultaneously.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
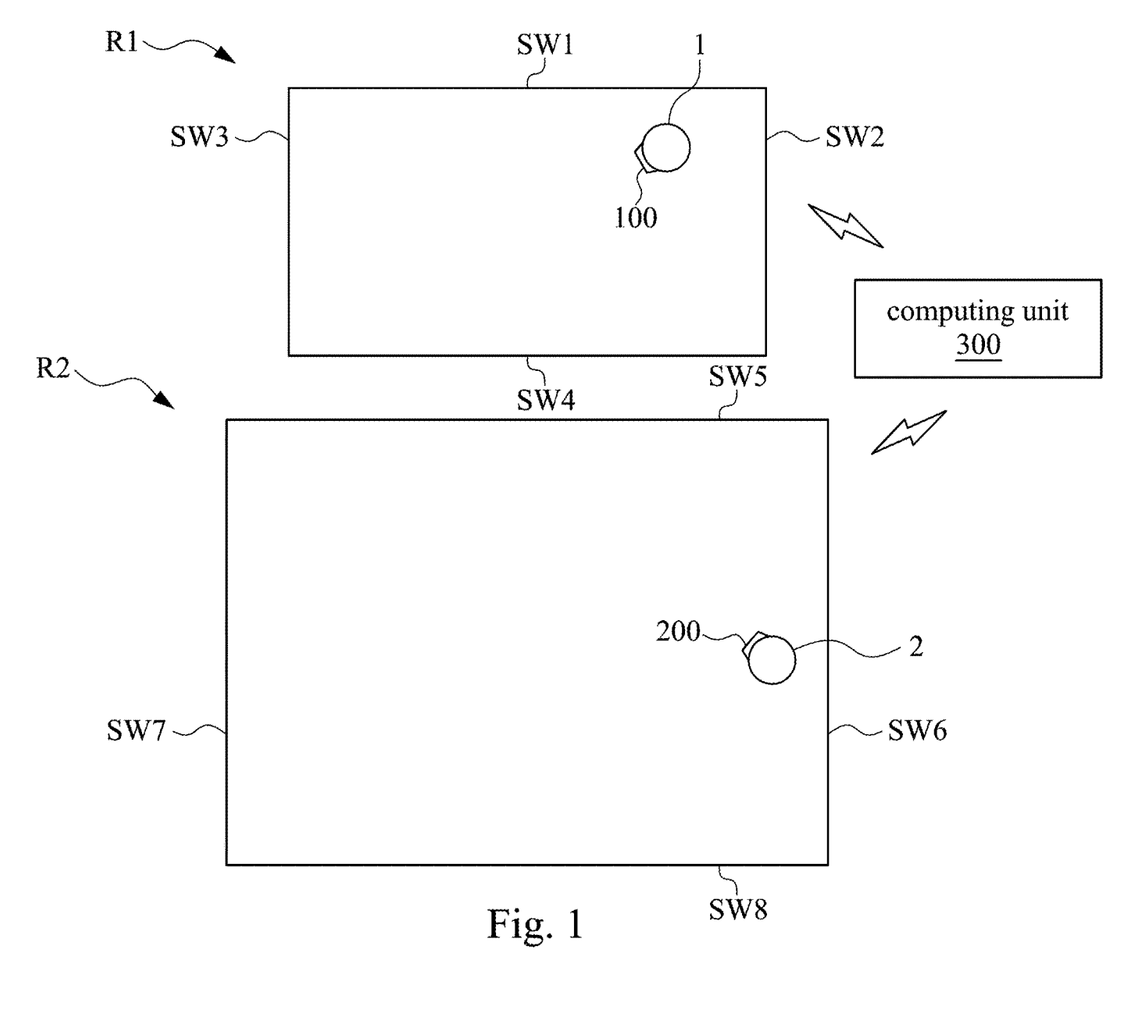
FIG. 1 is a schematic diagram for showing the backgrounds of an embodiment of present disclosure.

FIG. 1 is a schematic diagram for showing the backgrounds of an embodiment of present disclosure. As shown in FIG. 1, in the embodiment, user 1 and user 2 are having a virtual reality demonstration held in a virtual reality environment, wherein the virtual reality environment is a simulated environment built with virtual objects illustrated by computing units. User 1 is located in a first room R1. Viewing from above the first room R1 is shaped as a rectangle. User 1 is depicted as a circle from above. User 2 is located in a second room R2 other than the first room R1. Viewing from above the second room R2 is shaped as a rectangle larger than the first room R1. User 2 is depicted as a circle from above.

In the embodiment, a first wearable device 100 is carried by user 1 and a second wearable device 200 is carried by user 2. The first wearable device 100 carried by user 1 and operated in the first room R1 is configured to output a first scenario of the virtual reality environment to user 1, wherein the first scenario being displayed shows a partial view of the virtual reality environment from a first coordinate corresponding to the first wearable device 100. The second wearable device 200 carried by user 2 and operated in the second room R2 is configured to output a second scenario of the virtual reality environment to user 2, wherein the second scenario being displayed shows a partial view of the virtual reality environment from a second coordinate corresponding to the second wearable device 200. The first wearable device 100 is in communication with a computing unit 300 to receive signals for outputting the first scenario. The second wearable device 200 is in communication with the computing unit 300 to receive signals for outputting the second scenario. By sharing the virtual reality demonstration from different viewpoints, user 1 and user 2 may have a common ground to discuss. However, when merging two users located in different spaces having different sizes in the virtual reality environment, conflictions may happen if the system fails to map the available areas in the real world into the virtual reality environment.

Figure 2:
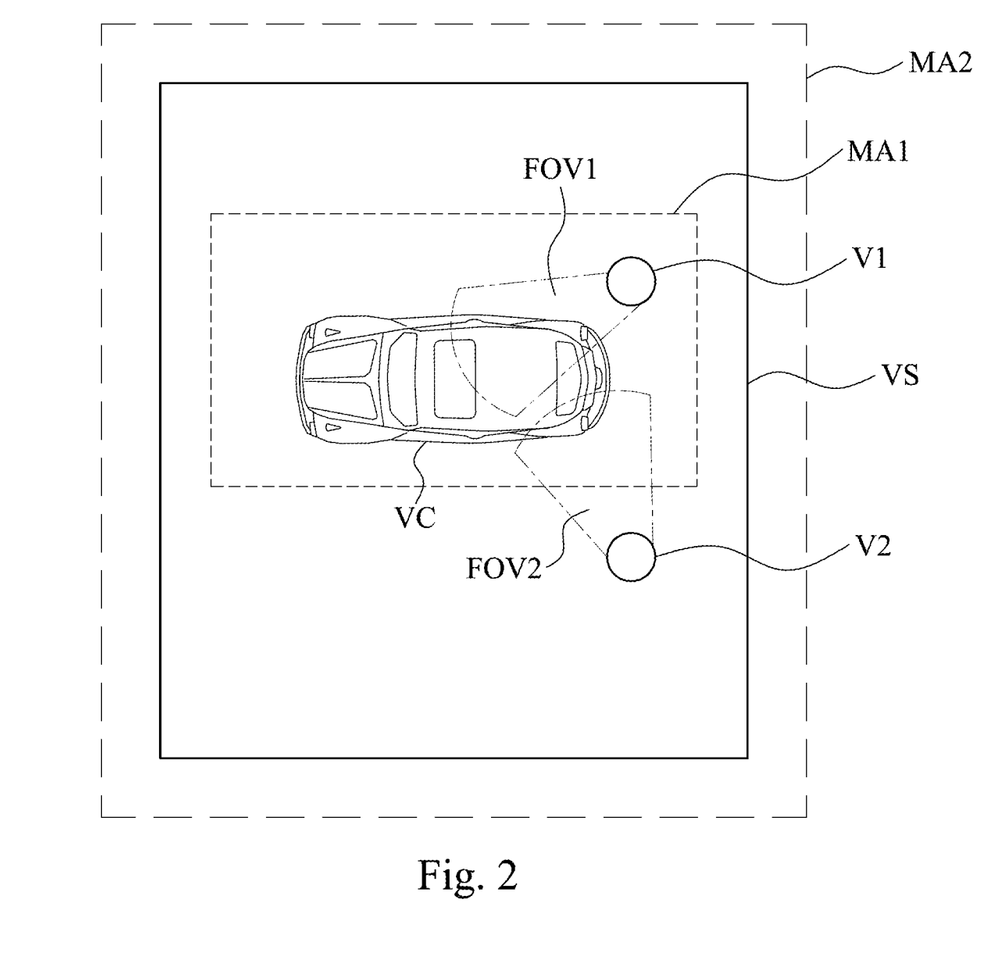
FIG. 2 is a schematic diagram of a system for providing a simulated environment according the embodiments of FIG. 1.

FIG. 2 is a schematic diagram of a system for providing a simulated environment to multiple users according the embodiments of FIG. 1. Said simulated environment is an environment built with virtual objects illustrated by computing devices, for example, may be a virtual reality environment, an augmented reality environment or a mixed reality environment. In the embodiment, the simulated environment is referring to the virtual reality environment described in FIG. 1. As shown in FIG. 1, when users of the virtual reality environment are located in different spaces having different sizes, present disclosure provides a way to properly determine the initial coordinates for the users in the virtual reality environment according to the constraints in these spaces. In the embodiment, a virtual space VS is depicted in FIG. 2 to show the size of the virtual reality environment determined by the computing unit 300 from above. A virtual roadster VC is being displayed in the virtual reality demonstration, as depicted as a car from above in FIG. 2.

In the embodiment, a first coordinate V1 is being assigned as an initial point corresponding to the first wearable device 100 in the virtual space VS, showing where user 1 is located in the virtual reality environment. A first field of view FOV1 is depicted in FIG. 2 to illustrate an area that the first scenario may cover in the virtual reality environment. The first field of view FOV1 indicates the viewpoint extended from the first coordinate V1. User 1 may observe the first field of view FOV1 via the first scenario when carrying the first wearable device 100. A second coordinate V2 is being assigned as an initial point corresponding to the second wearable device 200 in the virtual space VS, showing where user 2 is located in the virtual reality environment. A second field of view FOV2 is depicted in FIG. 2 to illustrate an area that the second scenario may cover in the virtual reality environment. The second field of view FOV2 indicates the viewpoint extended from the second coordinate V2. User 2 may observe the second field of view FOV2 via the second scenario when carrying the second wearable device 200.

In the embodiment, the first coordinate V1 and the second coordinate V2 are determined by the computing unit 300 shown in FIG. 1. The computing unit 300 is in communication with the first wearable device 100 and the second wearable device 200. The computing unit 300 is configured to retrieve a first spatial constraint of the first room R1 with respect to the first wearable device 100. When user 1 is wearing the first wearable device 100 in the first room R1, the computing unit 300 may retrieve the size of the first room R1 or layout of obstacles in first room R1. For example, according to FIG. 1, user 1 is located around a corner between a first side wall SW1 and a second side wall SW2 in the first room R1. In the embodiment, when user 1 is wearing the first wearable device 100 in the room R1, the computing unit 300 may retrieve the positions of the first side wall SW1 and the second side wall SW2 as first spatial constraints in first room R1. In the same manner, the computing unit 300 may retrieve the positions of a third side wall SW3 and a fourth side wall SW4 as first spatial constraints in first room R1. Therefore, the physical obstacles in first room R1 may be obtained by the computing unit 300. The computing unit 300 may assign proper first coordinate for the first wearable device 100 in the virtual reality environment. For example, in FIG. 2, the first coordinate V1 is assigned to user 1 in the virtual space VS. In some embodiments, the first spatial constraints in first room R1 is detected and sent to the computing unit 300 by the first wearable device 100. In some other embodiments, the first spatial constraints in first room R1 is detected and sent to the computing unit 300 by an individual detector (not shown in the figure) placed in the first room R1.

Moreover, in the embodiment, a first mapping area MA1 is depicted in FIG. 2 to show how the computing unit 300 maps first room R1 into the virtual reality environment. The boundaries of the first mapping area MA1 are determined according to the first spatial constrains obtained by the computing unit 300, including the first side wall SW1, the second side wall SW2, the third side wall SW3 and the fourth side wall SW4. It can be seen in FIG. 2 that almost the entire first room R1 is mapped to the virtual space VS. The first mapping area MA1 is provided to cover where the virtual roadster VC is located in the virtual reality environment. In this case, despite available areas of the first room R1 are limited, it is still available for user 1 to look around the virtual roadster VC via the first scenario in the first mapping area MA1. Virtual boundaries corresponding to the first side wall SW1, the second side wall SW2, the third side wall SW3 and the fourth side wall SW4 may be provided to the first scenario to prevent user 1 from hitting the true side walls of the first room R1. The first wearable device 100 may present different first field of view FOV1 in the first scenario according to the movements of user 1 in the first room R1. When user 1 moves close to the edge of the first mapping area MA1, virtual boundaries may be presented in the first scenario. The user 1 may not walk out of the first mapping area MA1 since the first mapping area MA1 is provided corresponding to the true size of the first room R1.

In the same manner, the computing unit 300 is configured to retrieve a second spatial constraint of the room R2 with respect to the second wearable device 200, such as a fifth side wall SW5, a sixth side wall SW6, a seventh side wall SW7 and a eighth side wall SW8 in the room R2, as shown in FIG. 1. In the embodiment, when user 2 is wearing the second wearable device 200 in the second room R2, the computing unit 300 may retrieve the positions of the fifth side wall SW5, the sixth side wall SW6, the seventh side wall SW7 and the eighth side wall SW8 as second spatial constraints in second room R2. Therefore, the physical obstacles in the second room R2 may be obtained by the computing unit 300. The computing unit 300 may assign proper second coordinate for the second wearable device 200 in the virtual reality environment. For example, in FIG. 2, the second coordinate V2 is assigned to the second wearable device 200 in the virtual space VS. In some embodiments, the second spatial constraints in second room R2 is detected and sent to the computing unit 300 by the second wearable device 200. In some other embodiments, the second spatial constraints in second room R2 is detected and sent to the computing unit 300 by an individual detector (not shown in the figure) placed in the second room R2.

Moreover, in the embodiment, a second mapping area MA2 is depicted in FIG. 2 to show how the computing unit 300 maps the second room R2 into the virtual reality environment. The boundaries of the second mapping area MA2 are determined according to the second spatial constrains obtained by the computing unit 300, including the fifth side wall SW5, the sixth side wall SW6, the seventh side wall SW7 and the eighth side wall SW8. It can be seen in FIG. 2 that the second mapping area MA2 is larger than the virtual space VS. The second mapping area MA2 is also provided to cover where the virtual roadster VC is located in the virtual reality environment. The second wearable device 200 may present different second field of view FOV2 in the second scenario according to the movements of user 2 in the second room R2. In this case, user 2 may only observe the virtual roadster VC via the second scenario in the virtual space VS. When user 2 locates between the second mapping area MA2 and the virtual space VS, the second wearable device 200 may not present the second scenario since the second coordinate V2 is out of the virtual space VS. The user 2 may not walk out of the second mapping area MA2 since the second mapping area MA2 is provided corresponding to the true size of the second room R2.

In the embodiment, the computing unit 300 is also configured to retrieve a first spatial vector of the first wearable device 100 with respect to the first room R1. The first spatial vector includes a first position and a first orientation of the first wearable device 100. For example, if user 1 is standing at a corner of the first room R1 and facing the first side wall SW1, the computing unit 300 may retrieve a first spatial vector of the first wearable device 100 with respect to the first room R1. Therefore, the position of user 1 with respect to the first room R1 may be confirmed by the computing unit 300. As mentioned in the embodiments, the positions of the first side wall SW1, the second side wall SW2, the third side wall SW3 and the fourth side wall SW4 in the first room R1 are collected by the computing unit 300 as first spatial constrains. The computing unit 300 may determine the first coordinate V1 for the first wearable device 100 according to a relationship between the first spatial vector and the first spatial constraints. Therefore, wherever user 1 is located in the first room R1, the computing unit 300 may assign the first coordinate V1 corresponding to the first wearable device 100 and map the first mapping area MA1 properly.

In the same manner, the computing unit 300 is also configured to retrieve a second spatial vector of the second wearable device 200 with respect to the second room R2. The second spatial vector and the second spatial constraints are used to determine the second coordinate V2 corresponding to the second wearable device 200 and map the second mapping area MA2 properly.

In some embodiments, the first spatial vector is collected and sent to the computing unit 300 by the first wearable device 100, and the second spatial vector is collected and sent to the computing unit 300 by the second wearable device 200. However, since the virtual space VS is provided for the virtual reality demonstration to the virtual roadster VC, the computing unit 300 may assign the first coordinate V1 and the second coordinate V2 close to the coordinates assigned to the virtual roadster VC. The configuration would be much convenient and intuitive for user 1 and user 2 to have a look at the virtual roadster VC.

Figure 3:
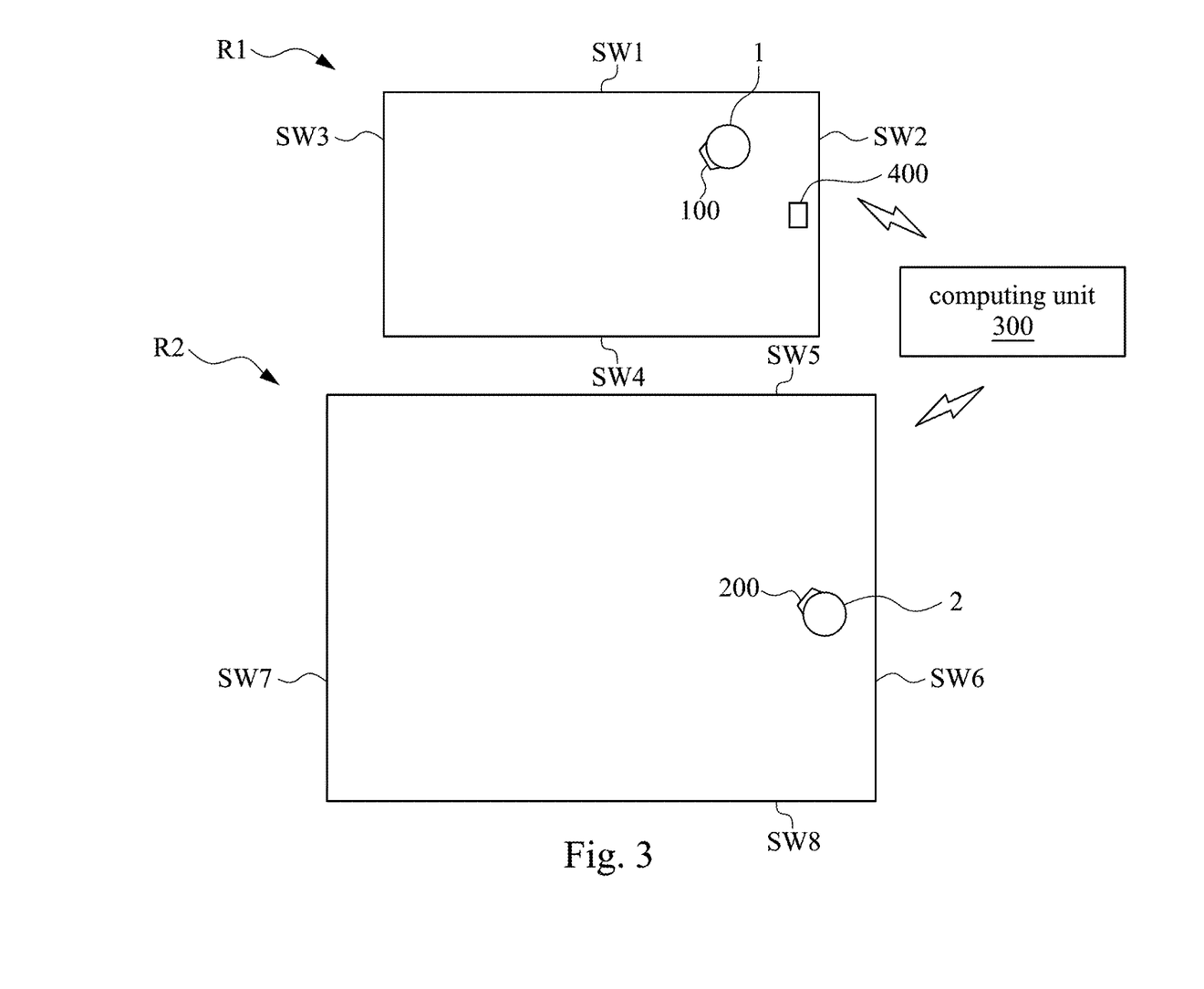
FIG. 3 is a schematic diagram for showing the backgrounds of an embodiment of present disclosure.

FIG. 3 is a schematic diagram for showing the backgrounds of an embodiment of present disclosure. As shown in FIG. 3, in the embodiment, user 1 and user 2 are having a virtual reality demonstration held in a virtual reality environment. User 1 is located in a first room R1. User 2 is located in a second room R2 other than the first room R1. What is depicted in FIG. 3 is substantially identical to FIG. 1 of present disclosure. However, in the embodiment, there is a vase 400 placed adjacent to a side wall of the first room R1, which is depicted as a small rectangle.

In the embodiment, a first wearable device 100 is carried by user 1 and a second wearable device 200 is carried by user 2. The first wearable device 100 operated in the first room R1 is configured to output a first scenario of the virtual reality environment to user 1, wherein the first scenario is determined by a viewpoint from a first coordinate corresponding to user 1. The second wearable device 200 operated in the second room R2 is configured to output a second scenario of the virtual reality environment to user 2, wherein the second scenario is determined by a viewpoint from a second coordinate corresponding to user 2. The first wearable device 100 is in communication with a computing unit 300 to receive signals for outputting the first scenario. The second wearable device 200 is in communication with the computing unit 300 to receive signals for outputting the second scenario.

Figure 4:
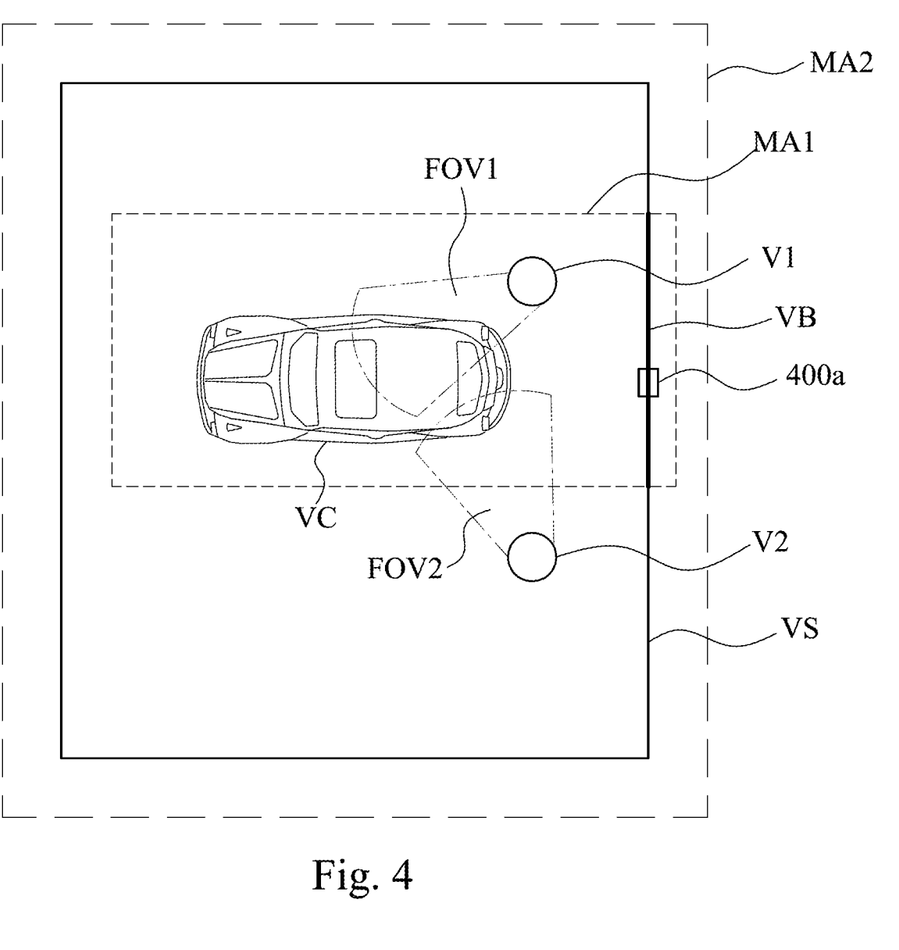
FIG. 4 is a schematic diagram of a system for providing a simulated environment according the embodiments of FIG. 3.

FIG. 4 is a schematic diagram of a system for providing a simulated environment to multiple users according the embodiments of FIG. 3. As the same as the embodiment shown in FIG. 2, there is a first mapping area MA1 depicted to show how the computing unit 300 maps first room R1 into the virtual reality environment, and there is a second mapping area MA2 depicted to show how the computing unit 300 maps second room R2 into the virtual reality environment. A virtual space VS shows the virtual reality environment provided by the computing unit 300. A first coordinate V1 and a second coordinate V2 are assigned to the first wearable device 100 and the second wearable device 200 respectively by the computing unit 300. A first field of view FOV1 is depicted in FIG. 4 to illustrate an area that the first scenario may cover in the virtual reality environment. The first field of view FOV1 indicates the viewpoint extended from the first coordinate V1. User 1 may observe the first field of view FOV1 via the first scenario when carrying the first wearable device 100. The second coordinate V2 is assigned as an initial point corresponding to the second wearable device 200 in the virtual space VS, showing where user 2 is located in the virtual reality environment. A second field of view FOV2 is depicted in FIG. 4 to illustrate an area that the second scenario may cover in the virtual reality environment. The second field of view FOV2 indicates the viewpoint extended from the second coordinate V2. User 2 may observe the second field of view FOV2 via the second scenario when carrying the second wearable device 200.

In the embodiments, when the computing unit 300 retrieves first spatial constraints of the first room R1, not only the first side wall SW1, the second side wall SW2, the third side wall SW3 and the fourth side wall SW4 would be retrieved, the vase 400 close to the second side wall SW2 would be retrieved as well. As the same as the aforementioned embodiments, the computing unit 300 may retrieve a first spatial vector of the first wearable device 100 with respect to the first room R1. The first coordinate V1 is determined according to the first spatial vector and the first spatial constraints. However, in the embodiment, the way that the computing unit 300 mapping the first room R1 with the virtual space VS is different from the embodiment of FIG. 2. It can be seen in FIG. 4 that the virtual space VS and the first mapping area MA1 is partially overlapped. The virtual boundaries corresponding to the first side wall SW1, the third side wall SW3 and the fourth side wall SW4 are still observable in the first scenario. A virtual boundary VB along the edge that the virtual space VS and the first mapping area MA1 are overlapped is provided by the computing unit 300. In this case, the position that the vase 400 is located (labeled as 400a) is behind the virtual boundary VB. Since user 1 may observe the virtual boundary VB in the first scenario, it would be less likely for user 1 to pass through the virtual boundary VB and break the vase 400. In this configuration, most of areas in the first room R1 are still available to user 1 except the area behind the virtual boundary VB in the virtual reality environment. As such, the computing unit 300 may retrieve layout of obstacles in the first room R1 as the first spatial constraints, and the first spatial constraints may be used to provide initial coordinates for user 1 or to provide virtual boundaries.

In the embodiment, the computing unit 300 may retrieve second spatial constraints of the room R2 with respect to the second wearable device 200, such as a fifth side wall SW5, a sixth side wall SW6, a seventh side wall SW7 and a eighth side wall SW8 in the room R2, as shown in FIG. 3. Therefore, the physical obstacles in the second room R2 may be obtained by the computing unit 300. The computing unit 300 may assign the second coordinate V2 is to user 2 in the virtual space VS. The second mapping area MA2 is depicted in FIG. 4 to show how the computing unit 300 maps the second room R2 into the virtual reality environment. The boundaries of the second mapping area MA2 are determined according to the second spatial constrains obtained by the computing unit 300, including the fifth side wall SW5, the sixth side wall SW6, the seventh side wall SW7 and the eighth side wall SW8.

Figure 5:
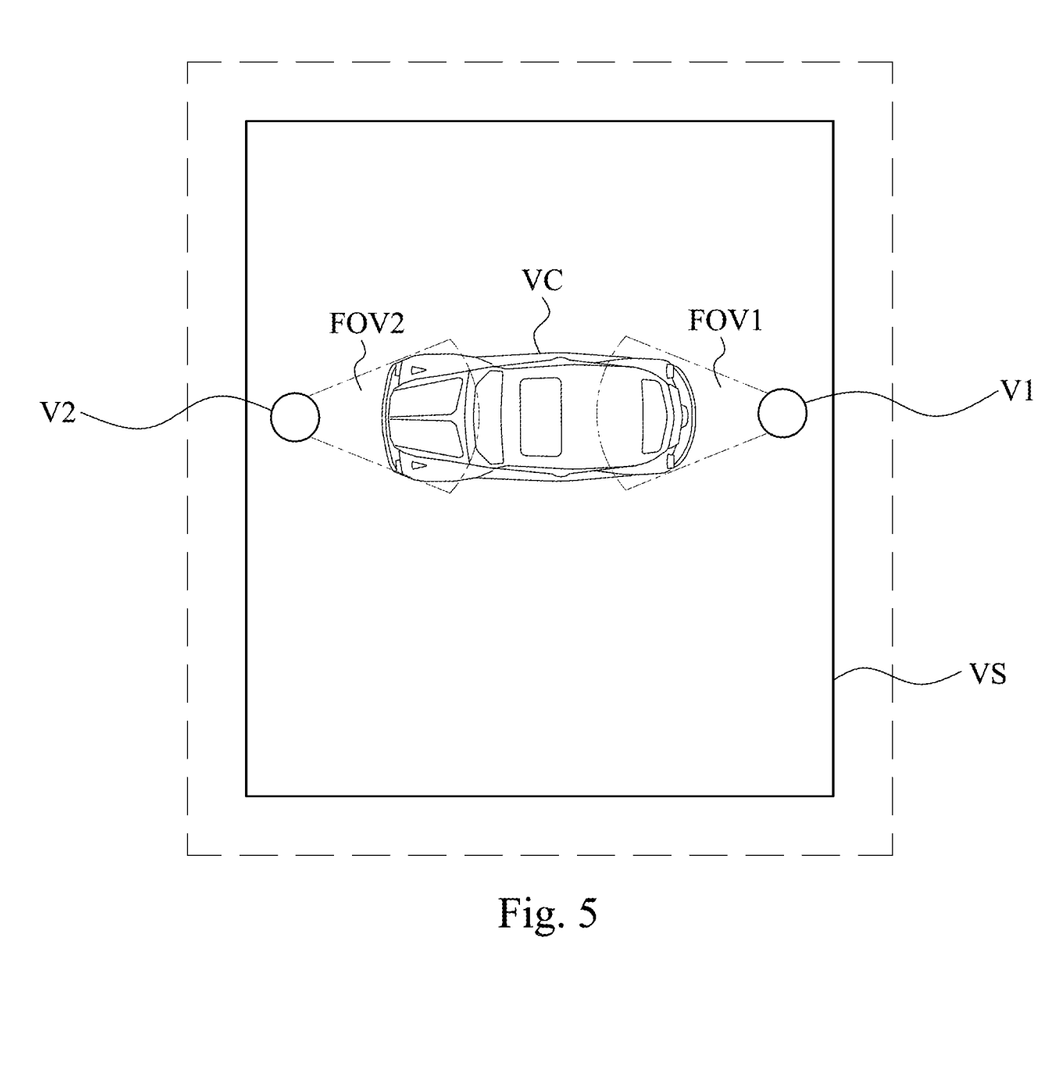
FIG. 5 is a schematic diagram for showing a system for providing a simulated environment according to the embodiments of FIG. 3.

FIG. 5 is a schematic diagram for showing a system for providing a simulated environment to multiple users according to the embodiments of FIG. 3. As shown in FIG. 5, in the embodiment, a virtual space VS shows the virtual reality environment provided by the computing unit 300 depicted in FIG. 3. A first coordinate V1 and a second coordinate V2 are assigned to the first wearable device 100 and the second wearable device 200 respectively by the computing unit 300. A first field of view FOV1 is depicted in FIG. 5 to illustrate an area that the first scenario may cover in the virtual reality environment. The first field of view FOV1 indicates the viewpoint extended from the first coordinate V1. User 1 may observe the first field of view FOV1 via the first scenario when carrying the first wearable device 100. A second coordinate V2 is assigned as an initial point corresponding to the second wearable device 200 in the virtual space VS, showing where user 2 is located in the virtual reality environment. A second field of view FOV2 is depicted in FIG. 5 to illustrate an area that the second scenario may cover in the virtual reality environment. The second field of view FOV2 indicates the viewpoint extended from the second coordinate V2. User 2 may observe the second field of view FOV2 via the second scenario when carrying the second wearable device 200.

In the embodiment, the virtual roadster VC is being represented in the virtual space VS. The first coordinate V1 corresponding to the first wearable device 100 is assigned around the rear of the virtual roadster VC. The second coordinate V2 corresponding to the second wearable device 200 is assigned around the front of the virtual roadster VC. In the embodiment, since user 1 is an engineer who designed the rear part of the virtual roadster VC, the computing unit 300 assigns the first coordinate V1 around the rear of the virtual roadster VC. In this way, as soon as user 1 may observe the first scenario provided by the first wearable device 100, the rear of the virtual roadster VC may be covered by the first field of view FOV1. Since user 2 is an engineer who designed the front part of the virtual roadster VC, the computing unit 300 assigns the second coordinate V2 around the front of the virtual roadster VC. In this way, as soon as user 2 may observe the second scenario provided by the second wearable device 200, the front of the virtual roadster VC may be covered by the second field of view FOV2. As such, the computing unit 300 may assigned the first coordinate V1 or the second coordinate V2 according to the needs or interests of the users. For which part or angle of the virtual roadster VC should be presented to a user at first glance may be determined by several factors, such as ages, identity, duties, tasks or gender of the user.

However, it should be understood that the computing unit 300 illustrated in abovementioned figures is only an example. In some embodiments, the computing unit 300 may be a CPU, GPU, or some control unit configured in the first wearable device 100 or the second wearable device 200. Depends on which wearable device is configured with the computing unit 300, the first and the second spatial constraints will be sent to that wearable device and being processed by the computing unit 300.

Figure 6:
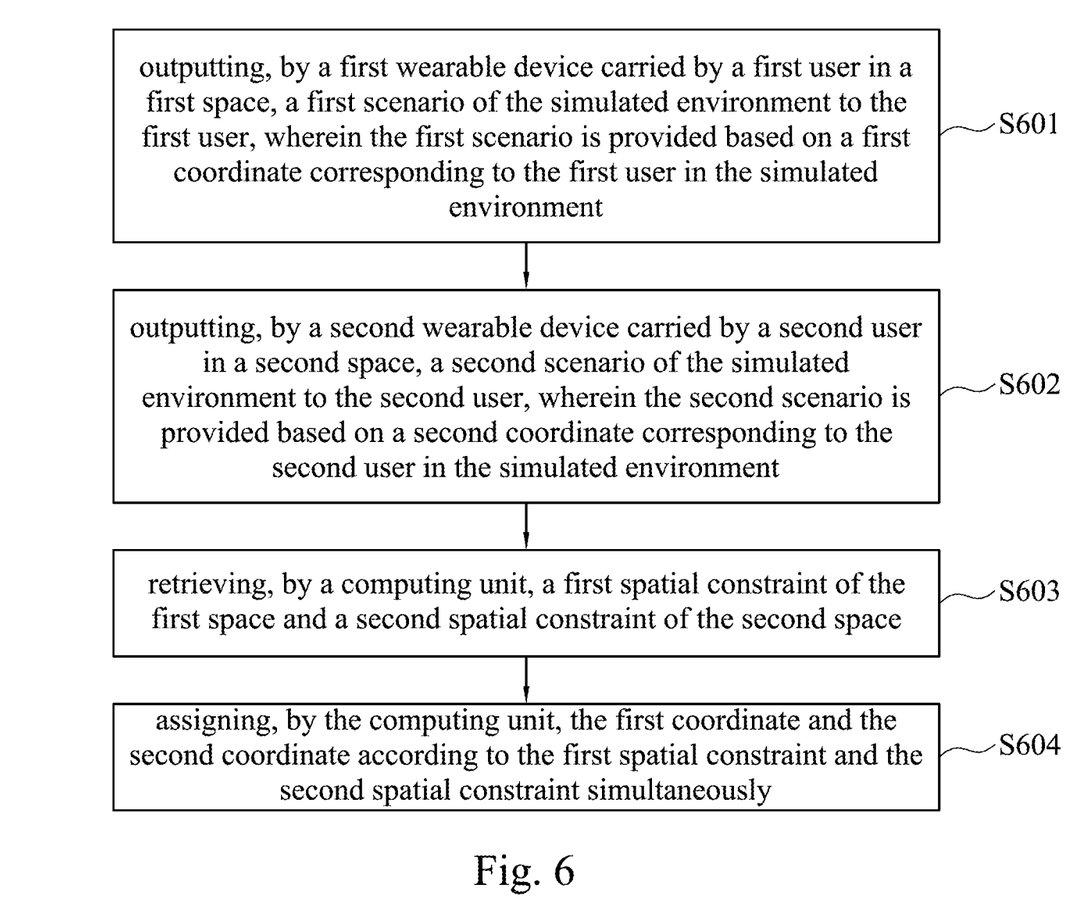
FIG. 6 is a flow chart of a method for providing a simulated environment according to some embodiments of present disclosure.

FIG. 6 is a flow chart of a method for providing a simulated environment to multiple users according to some embodiments of present disclosure. The steps of the method will be listed and explained in detail in following segments.

Step S601: outputting, by a first wearable device carried by a first user in a first space, a first scenario of the simulated environment to the first user, wherein the first scenario is provided based on a first coordinate corresponding to the first user in the simulated environment. As shown in FIG. 1 to FIG. 5, the first wearable device 100 is configured to associate with the computing unit 300 for outputting the first scenario of the virtual reality environment to user 1. The first field of view FOV1 in the virtual space VS indicates the area that user 1 may observe via the first scenario. The first field of view FOV1 is extended from the first coordinate V1, wherein the first coordinate V1 is the initial coordinate assigned to the first wearable device 100 in the virtual space VS by the computing unit 300. User 1 may carry the first wearable device 100 and move in the first room R1, and the first scenario provided by the computing unit 300 may change accordingly. User 1 may observe the virtual roaster VC in the first scenario when the coordinate corresponding to the virtual roaster VC is covered by the first field of view FOV1.

Step S602: outputting, by a second wearable device carried by a second user in a second space, a second scenario of the simulated environment to the second user, wherein the second scenario is provided based on a second coordinate corresponding to the second user in the simulated environment. As shown in FIG. 1 to FIG. 5, the second wearable device 200 is configured to associate with the computing unit 300 for outputting the second scenario of the virtual reality environment to user 2. The second field of view FOV2 in the virtual space VS indicates the area that user 2 may observe via the second scenario. The second field of view FOV2 is extended from the second coordinate V2, wherein the second coordinate V2 is the initial coordinate assigned to the second wearable device 200 in the virtual space VS by the computing unit 300. User 2 may carry the second wearable device 200 and move in the second room R2, and the second scenario provided by the computing unit 300 may change accordingly. User 2 may observe the virtual roaster VC in the second scenario when the coordinate corresponding to the virtual roaster VC is covered by the second field of view FOV2.

Step S603: retrieving, by a computing unit, a first spatial constraint of the first space and a second spatial constraint of the second space. As shown in FIG. 1 to FIG. 5, the computing unit 300 may retrieve the positions of the first side wall SW1, the second side wall SW2, the third side wall SW3, the fourth side wall SW4 and the vase 400 as the first spatial constrains in the first room R1. The computing unit 300 may retrieve the positions of the fifth side wall SW5, the sixth side wall SW6, the seventh side wall SW7 and the eighth side wall SW8 as the second spatial constrains in the second room R2. As mentioned, in some embodiments, the first spatial constraints and the second spatial constraints are collected by the first wearable device 100 and the second wearable device 200. The computing unit 300 may retrieve the first spatial constraints and the second spatial constraints from the first wearable device 100 and the second wearable device 200 respectively.

Step S604: assigning, by the computing unit, the first coordinate and the second coordinate according to the first spatial constraint and the second spatial constraint simultaneously. As shown in FIG. 1 to FIG. 5, the first coordinate V1 is assigned to the first wearable device 100 and the second coordinate V2 is assigned to the second wearable device 200. The assignation is determined by the first spatial constraints and the second spatial constraints collected from the first room R1 and the second room R2. The computing unit 300 may further determine how to map available areas in first room R1 into the virtual reality environment as the first mapping area MA1. The computing unit 300 may also determine how to map available areas in the second room R2 into the virtual reality environment as the second mapping area MA2. The computing unit 300 may provide virtual boundaries according to the collected first spatial constraints and second spatial constraints in the virtual space VS. Therefore, it would be less likely for user 1 and user 2 to run into obstacles in the first room R1 and the second room R2.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for providing a virtual reality environment, comprising:

a first wearable device operated in a first room having a plurality of walls, wherein the first wearable device detects the walls of the first room and outputs first wall spatial constraints corresponding to the walls of the first room;

a second wearable device operated in a second room different from the first room and having a plurality of walls, wherein the second wearable device detects the walls of the second room and outputs second wall spatial constraints corresponding to the walls of the second room; and a computing unit communicated with the first wearable device and the second wearable device, and configured to:

retrieve the first wall spatial constraints from the first wearable device and the second wall spatial constraints from the second wearable device;

map a first mapping area into the virtual reality environment, wherein boundaries of the first mapping area are determined according to the first wall spatial constraints;

map a second mapping area into the virtual reality environment, wherein boundaries of the second mapping area are determined according to the second wall spatial constraints;

retrieve a first spatial vector of the first wearable device with respect to the first room, wherein the first spatial vector includes a first position and a first orientation of the first wearable device in the first room;

retrieve a second spatial vector of the second wearable device with respect to the second room, wherein the second spatial vector includes a second position and a second orientation of the second wearable device in the second room;

determine a first coordinate point for a first virtual representation of the first wearable device in the virtual reality environment, wherein the first coordinate point is determined according to a relationship between the first spatial vector and the first wall spatial constraints, and is within the first mapping area, and is an initial point of the first virtual representation of the first wearable device in the virtual reality environment, wherein the first wearable device is configured to output a first scenario of the virtual reality environment showing a partial view of the virtual reality environment from the first coordinate point; and determine a second coordinate point for a second virtual representation of the second wearable device in the virtual reality environment, wherein the second coordinate point is determined according to a relationship between the second spatial vector and the second wall spatial constraints, and is within the second mapping area, and is an initial point of the second virtual representation of the second wearable device in the virtual reality environment, wherein the second wearable device is configured to output a second scenario of the virtual reality environment showing a partial view of the virtual reality environment from the second coordinate point.

2. The system of claim 1, wherein when there is an object in the first room, the first wearable device further detects the object in the first room and outputs a first object spatial constraint corresponding to the object in the first room, and the computing unit is further configured to:
retrieve the first object spatial constraint from the first wearable device;
show a position of the object in the virtual reality environment; and
generate a virtual boundary in front of or passing through the position of the object in the virtual reality environment, wherein the virtual boundary forms an edge of the virtual reality environment and an area behind the virtual boundary in a direction away from the remainder of the virtual reality environment is unavailable to the first virtual representation of the first wearable device.

3. The system of claim 1, wherein when the first room is smaller than the second room, the boundaries of the first mapping area are mapped fully within the virtual reality environment, and in response to the first virtual representation of the first wearable device approaching an edge of the first mapping area, the computing unit presents virtual boundaries in the first scenario corresponding to the first mapping area.

4. A method for providing a virtual reality environment, comprising:
detecting, by a first wearable device operated in a first room having a plurality of walls, the walls of the first room;
outputting, by the first wearable device, first wall spatial constraints corresponding to the walls of the first room;
detecting, by a second wearable device operated in a second room different from the first room and having a plurality of walls, the walls of the second room;
outputting, by the second wearable device, second wall spatial constraints corresponding to the walls of the second room;
communicating, by a computing unit, with the first wearable device and the second wearable device;
retrieving, by the computing unit, the first wall spatial constraints from the first wearable device and the second wall spatial constraints from the second wearable device;
mapping, by the computing unit, a first mapping area into the virtual reality environment, wherein boundaries of the first mapping area are determined according to the first wall spatial constraints;
mapping, by the computing unit, a second mapping area into the virtual reality environment, wherein boundaries of the second mapping area are determined according to the second wall spatial constraints;
retrieving, by the computing unit, a first spatial vector of the first wearable device with respect to the first room, wherein the first spatial vector includes a first position and a first orientation of the first wearable device in the first room;
retrieving, by the computing unit, a second spatial vector of the second wearable device with respect to the second room, wherein the second spatial vector includes a second position and a second orientation of the second wearable device in the second room;
determining, by the computing unit, a first coordinate point for a first virtual representation of the first wearable device in the virtual reality environment, wherein the first coordinate point is determined according to a relationship between the first spatial vector and the first wall spatial constraints, and is within the first mapping area, and is an initial point of the first virtual representation of the first wearable device in the virtual reality environment, wherein the first wearable device is configured to output a first scenario of the virtual reality environment showing a partial view of the virtual reality environment from the first coordinate point; and
determining, by the computing unit, a second coordinate point for a second virtual representation of the second wearable device in the virtual reality environment, wherein the second coordinate point is determined according to a relationship between the second spatial vector and the second wall spatial constraints, and is within the second mapping area, and is an initial point of the second virtual representation of the second wearable device in the virtual reality environment, wherein the second wearable device is configured to output a second scenario of the virtual reality environment showing a partial view of the virtual reality environment from the second coordinate point.

5. The method of claim 4, wherein when there is an object in the first room, the method further comprises:
detecting, by the first wearable device, the object in the first room;
outputting, by the first wearable device, a first object spatial constraint corresponding to the object in the first room;
retrieving, by the computing unit, the first object spatial constraint from the first wearable device;
showing, by the first wearable device, a position of the object in the virtual reality environment; and
generating, by the first wearable device, a virtual boundary in front of or passing through the position of the object in the virtual reality environment, wherein the virtual boundary forms an edge of the virtual reality environment and an area behind the virtual boundary in a direction away from the remainder of the virtual reality environment is unavailable to the first virtual representation of the first wearable device.

6. The method of claim 4, wherein when the first room is smaller than the second room, and the boundaries of the first mapping area are mapped fully within the virtual reality environment, the method further comprises:
presenting, by the computing unit, virtual boundaries in the first scenario corresponding to the first mapping area in response to the first virtual representation of the first wearable device approaching an edge of the first mapping area.

* * * * *